Patented June 16, 1953

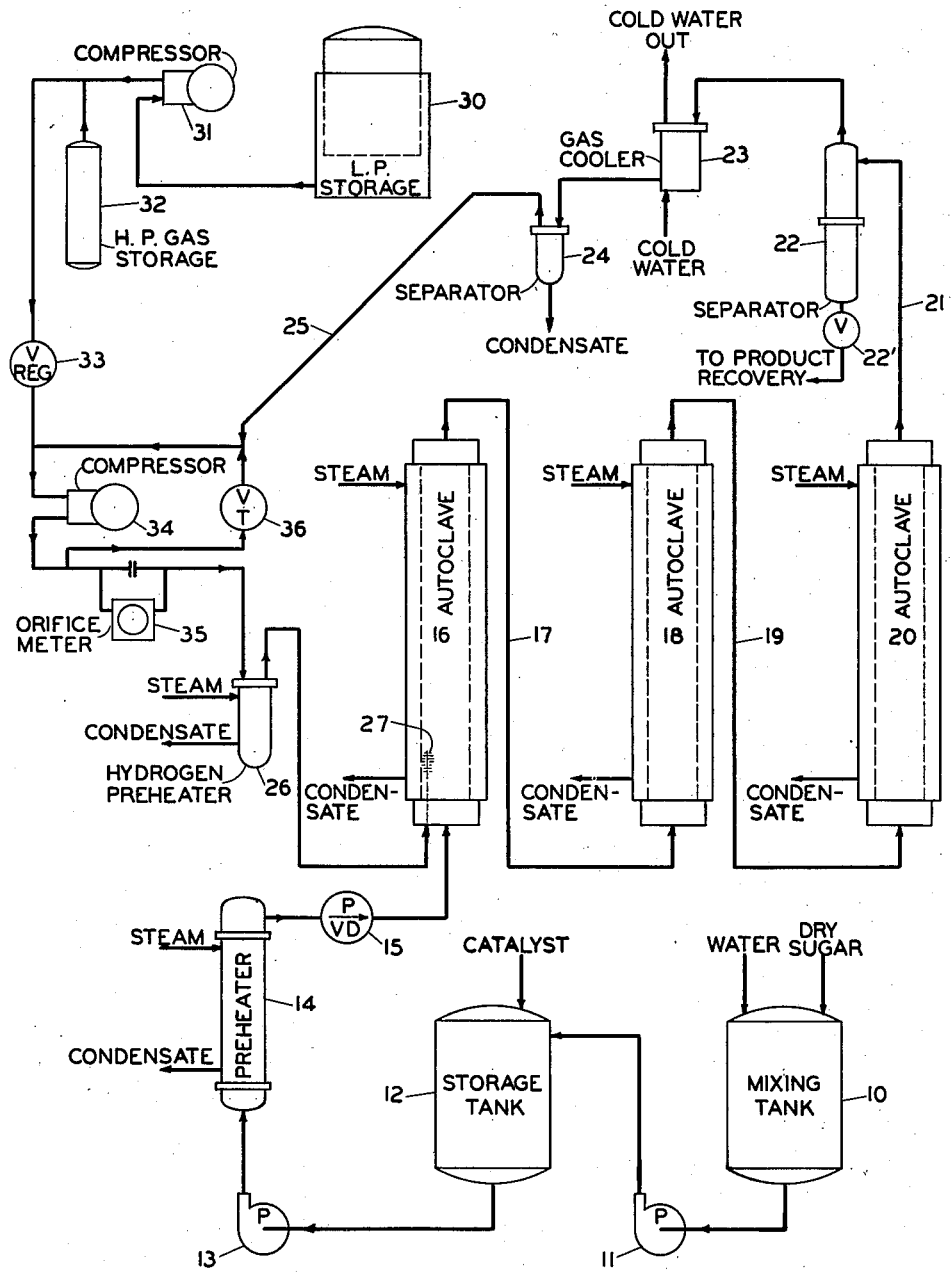

2,642,462

UNITED STATES PATENT OFFICE 2,642,462

PROCESS FOR CONTINUOUS HYDROGENATION OF SUGARS

Leo Kasehagen, West Chester, Pa., assignor to Atlas Powder Company, Wilmington, Del., a corporation of Delaware Application June 14, 1948, Serial No. 32,845

9 Claims. (Cl. 260—635)

The present invention relates to a process for hydrogenating reducible sugars, and more particularly to a continuous form of said process.

An object of this invention is to provide control of operating variables to obtain maximum hydrogenation of sugar.

Specifically the invention provides for control of the rate of hydrogen feed into a continuous sugar hydrogenating system to maintain the maximum rate of hydrogenation of the sugar.

More specifically the invention provides for control of the rate of hydrogen feed into a continuous system for hydrogenating glucose to sorbitol, in the presence of a supported reduced nickel catalyst, to maintain the maximum rate of sorbitol production.

The above and other objects will become apparent in the course of the following description.

The hydrogenation of reducible sugars by direct reaction of hydrogen and the sugars in the presence of a catalyst is a well known chemical reaction. In this reaction a sugar containing an aldehyde or ketone group is reduced to polyhydric alcohol. Thus, xylose produces xylitol, glucose produces sorbitol, fructose produces sorbitol and mannitol, mannose produces mannitol, lactose produces lactositol, etc. Mixtures of reducible sugars such as inverted sucrose and inverted lactose can be hydrogenated to yield the polyhydric alcohols corresponding to the individual sugars in the mixture. Other reactions can be carried out before, during or after hydrogenation to change the composition of the product from the direct sugar reduction product. Thus, isomerization of the starting sugar can be performed before or during hydrogenation by the use of alkaline materials so that the ultimate reduction product is a mixture of the several polyhydric alcohols corresponding to the isomers of the sugar. For example, by the isomerization of glucose with alkali (caustic soda, lime, etc.) either before or during hydrogenation, the hydrogenation product is a mixture of sorbitol and mannitol, the mannitol being derived from fructose and mannose formed by isomerization of glucose. Other reactions that can be carried out are degradation, carbon chain splitting, hydrogenolysis, hydrogenation of hydroxy groups to hydrocarbon groups, and the like, by selection of conditions of temperature, pH, added chemical agents, etc. in accordance with known procedures.

The processes and reactions described in the preceding paragraph are known and many of them have been successfully practised in batch operations. As the result of this earlier work the art well understands the control of basic operating conditions to produce desired products in a batch operation. Thus the selection of a suitable sugar, choice of solvent, concentration of solution, choice of catalyst, proportion of catalyst to sugar, temperature, pressure, and time of reaction are known elements in batch operations.

In translating these hydrogenations to continuous operation, however, it was discovered that there is another critical operating condition to control in order to obtain maximum reduction, namely, the rate of hydrogen feed. It is with the control of this rate that the present invention is concerned.

In the continuous process, hydrogenation is carried out in a number of reactors connected in series. Sugar solution containing a supported reduced nickel catalyst in suspension is continuously pumped into the bottom of the first reactor. The sugar is partially hydrogenated in this reactor, and flows out the top along with the catalyst and is piped to the bottom of the next reactor. Hydrogenation is carried still further in this reactor, and by using a sufficient number of reactors, the extent of hydrogenation can be carried as close to the equilibrium value as is desired. The solution flowing out the top of the last reactor is the product. Hydrogen is bubbled continuously into the bottom of the first reactor through a perforated distributing pipe. The hydrogen bubbles up through the sugar solution. It agitates the sugar solution and catalyst, is adsorbed on the catalyst, and reacts with the sugar. The excess hydrogen flows out the top of the reactor along with the partially hydrogenated sugar solution and catalyst and is led into the bottom of the second reactor through the same pipe as the sugar solution and catalyst. The hydrogen coming out the top of the last reactor in the series is separated from the product and catalyst and is returned to the bottom of the first reactor by means of a circulating compressor. Hydrogen from a high pressure storage vessel is added to the system in order to replace the hydrogen reacting with the sugar and thus keep the system at constant pressure. Similarly, product and catalyst are discharged from the system as fast as raw sugar solution and fresh catalyst are pumped into the system.

The figure in the drawing is a flow sheet of a typical continuous sugar hydrogenation plant.

The sugar to be reduced and water are introduced into the mixing tank 10 in suitable proportions to make a sugar solution of the desired concentration. Solution from the mixing tank is pumped by the pump 11 to a storage tank 12 in which a diatomaceous earth supported reduced nickel catalyst in finely divided form is added in proportion to give the desired catalyst to sugar ratio. The storage tank 12 is an agitated tank in which the slurry of catalyst and sugar solution are kept homogeneous. The pump 13 moves the slurry from the storage tank 12 to the pre-heater 14 to warm the slurry before introducing it into the autoclave. A variable delivery pump 15 feeds the pre-heated slurry into the bottom of the first autoclave 16 at a selected rate.

Hydrogen for the process is initially drawn from a low pressure storage tank 30, compressed by the compressor 31 and stored in high pressure gas storage bottle 32. From the bottle 32 hydrogen is admitted to the reactors through the regulating valve 33, circulating compressor 34, orifice meter 35, hydrogen pre-heater 26 and perforated nozzle 27 in the lower end of the first autoclave 16. After the system is filled with hydrogen the main body of hydrogen in the reactors is maintained by a circulating system, to be described hereinafter, with the addition of make-up hydrogen from the high pressure storage bottle 32 as required to replace chemically combined hydrogen and any losses that may have occurred in the system.

The autoclave 16 is jacketed and heated to maintain the operating temperature. The slurry and hydrogen introduced into the bottom of the autoclave 16 move upwardly and pass out of the top of the autoclave through a pipe 17 and into the bottom of the second autoclave 18 which is also a jacketed and heated vessel. The slurry and hydrogen progress upwardly through the autoclave 18 and are drawn off in the pipe 19 and introduced at the bottom of the third autoclave 20 which is of the same jacketed and heated construction as autoclaves 16 and 18. It will be understood that the process is not limited to the use of three autoclaves, this number being shown for purpose of illustration.

From the top of the third and last autoclave in the series 20, the excess hydrogen and the slurry, which at this time consists of a solution of the sugar reduction product with a small amount of the sugar (the exact quantity will depend upon the extent of the reduction in the system) and suspended spent catalyst, passes through a pipe 21 to a gas and liquid separator 22 in which free hydrogen gas is separated from the slurry. The slurry is drawn from the bottom of the separator 22, is reduced to atmospheric pressure through a valve 22′, and passes to a product recovery system for removal of the suspended spent catalyst and other treatments as required.

Hydrogen from the separator 22 is carried to the gas cooler 23 where its temperature is lowered to permit condensation of water vapor. The cooled gas is passed through a water separator 24 and the separated water drained off. Hydrogen from the separator 24, which is still at substantially operating pressure, is returned to the low pressure side of the circulating compressor 34 through the line 25. The circulating compressor, in the illustrated form of the apparatus, runs at constant speed and is provided with a by-pass controlled by the throttle valve 36 for the purpose of permitting the maintenance of a selected rate of flow into the reactors. The meter 35 measures the rate of flow into the reactors and the valve 36 can be controlled either manually or by means of well-known automatic meter-responsive controls, to compensate for fluctuation in the system. The regulating valve 33 is preferably a pressure responsive valve which automatically admits make-up hydrogen from the high pressure storage bottle 32 as required to maintain the pressure of hydrogen in the system.

In the system illustrated, the rate of feed of the sugar and catalyst slurry can be varied by adjustment of the variable delivery pump 15. The rate of hydrogen feed can also be varied by the setting of the throttle valve 36. By means of these adjustments the rate of hydrogen feed relative to the rate of hydrogen usage in the chemical reaction can be adjusted to a value which is required for maximum performance in accordance with the teachings of this invention.

The bulk of the hydrogenating is done in the first reactor. For example, hydrogenation may be 90% complete as the solution leaves this reactor. Then in the second reactor 90% of the remaining 10% of the original sugar would be hydrogenated, and in the third reactor 90% of the remaining 1% of the original sugar would be hydrogenated, and so on, so that complete hydrogenation could be approached as closely as desired by using the proper number of reactors. Actually the picture is somewhat more complicated. The reverse reaction, the dehydrogenation of polyhydric alcohol to sugar and hydrogen, becomes important in the third and following reactors. Instead of approaching complete hydrogenation as the number of reactors is increased, an equilibrium value for sugar concentration is approached beyond which the hydrogenation cannot go. However, the main point is that most of the actual reacting of hydrogen with sugar is done in the first reactor, and it has been found that if hydrogenation is efficient in the first reactor, it is likewise efficient in the remaining reactors, which would indicate that obtaining efficient hydrogenation is more difficult in the first than in succeeding reactors.

The extent of hydrogenation in the first reactor depends on the volume of the reactor, the concentration of the solution and the rate at which it is fed into the reactor, the activity and concentration of the catalyst, the pressure and temperature at which the reaction is taking place and within certain limits as will be explained later, the rate at which hydrogen is bubbled into the reactor. If each of the above independent variables, except the rate of introducing hydrogen, is held constant, and the hydrogen rate varied, it is found that there exists a critical hydrogen rate, below which the extent of hydrogenation depends on the hydrogen rate, and above which the extent of hydrogenation is independent of hydrogen rate. If, for example, a hydrogen rate above the critical rate is being used and an extent of hydrogenation of 90% is observed, then doubling the hydrogen rate will still leave the extent of hydrogenation at 90%. If, however, the hydrogen rate were lowered below the critical rate, then the extent of reduction might decline to 80%, or 70%, or 60% or even lower, depending upon the amount by which the hydrogen rate was lowered. Thus the critical rate represents the lowest rate which will give the greatest extent of hydrogenation possible under the existing conditions. In practice, the hydrogen rate used should be somewhat higher than the critical rate, in order to make sure that the greatest extent of hydrogenation is obtained, but it should not be too greatly in excess of the critical rate because it increases the cost of pumping and increases wear on equipment due to the increased velocities involved. Since the use of high hydrogen rates does not increase the extent of reduction, it is obvious that the hydrogen rate should be kept as low as possible, but not below the critical rate.

The critical hydrogen rate involves three elements, first, a rate equal to the rate of hydrogen consumption in the chemical reaction, secondly, a rate sufficient to keep the reaction mixture agitated and the catalyst suspended, and thirdly, a relatively large empirical excess over the first two. The reason for the necessity of this third element is not known. The rate of hydrogen consumption is determined by the rate of feed of sugar and the extent of reduction, and is therefore capable of calculation from known conditions of catalyst activity, proportion of catalyst to sugar, and the time the mixture remains in the reactor. The second and third elements of the critical hydrogen rate have been determined empirically and a formula has been devised to express the experimental findings. It was found that the linear rate of hydrogen feed was the critical factor, rather than the quantity of hydrogen. In support of this finding, it was established that if the hydrogen rate were expressed as volume of free gas per unit time the critical rate depended upon the pressure and the rate of hydrogen usage in the chemical reaction. The effect of pressure was found to be direct and linear, that is, doubling the pressure would double the critical hydrogen rate, other conditions being the same. If, however, the hydrogen rate be expressed as volume per unit time measured at reactor conditions of temperature and pressure, then the critical rate is independent of reaction temperature and pressure.

Since the critical hydrogen rate is independent of pressure as long as the rate is expressed in terms of volume measured at reactor conditions, the rate can also be expressed in terms of linear velocity. Thus it was determined experimentally in a 3 inch inside diameter x 6 feet high continuous reactor that the critical hydrogen rate (CHR) in cubic feet per hour at reactor pressure and temperature is expressed by the equation.

(Equation I) $CHR = 3.76 + 0.130H$ wherein $H$=rate of hydrogen usage in cubic feet per hour at 0° C. and 1 atmosphere.

Dividing this equation by the cross sectional area of the experimental reactor, the CHR value in linear feet per hour through the reactor, at reactor pressure and temperature, becomes (Equation II) $CHR = 76.5 + 2.65H$ wherein H has the same value as in Equation I.

Equation II is still applicable only to the particular reactor. To obtain a universal equation it is necessary to express the rate at which hydrogen is being used (H) as the rate per unit of reactor cross section, rather than as the rate for the entire reactor. Thus, Equation II becomes (Equation III)

$CHR = 76.5 + 0.130H$ wherein CHR is expressed in terms of linear feet per hour through the reactor at reactor pressure and temperature, and $H$=rate of hydrogen usage in cubic feet (0° C. and 1 atmosphere) per hour per square foot of reactor cross section.

Equation III can be modified for convenience to suit operating conditions. For example, corrections can be made for the measurement of hydrogen feed at other than reactor temperature and/or pressure, and given a specific sized reactor the equation can be simplified for use by writing it in terms of the actual area instead of the general unit area form of Equation III. These modifications are obvious mathematical variations in the expression of the discovery which forms the basis of this invention.

The critical hydrogen rate expressed in the foregoing equations has been found experimentally to be valid for various sugars, rates of hydrogenation, pressures, temperatures, and sizes of reactors. The use of hydrogen rates slightly below those called for by the equations results in the extent of hydrogenation dropping below the maximum it could attain. The lower the hydrogen rate is dropped below the critical rate, the lower becomes the extent of hydrogenation. A point is reached where extent of hydrogenation is so low that another reaction, thermal decomposition of the sugar sets in. This results in formation of acids which destroy the activity of the catalyst, causing still further lowering of extent of reduction. The final result of using too low a hydrogen rate can be a large amount of tar formation or even complete carbonization of the sugar. A knowledge of the critical hydrogen rate is quite important. If a plant were designed with hydrogen circulation capacity inadequate to maintain the hydrogen rate above the critical, that plant could not attain the maximum extent of sugar reduction.

The existence of the critical hydrogen rate was not obvious. In carrying out the process, it was obvious that the hydrogen rate had to be high enough to keep the catalyst in suspension. It was found experimentally that a linear hydrogen rate of 27.8 feet per hour in the reactor measured at reactor conditions was sufficient to keep the catalyst in suspension. Comparing this with Equation II or III, it may be seen that the critical hydrogen rates are practically three times as great, even for very low rates of hydrogen usage. Thus the rate which was the obvious one, that required to keep the catalyst in suspension, was nowhere nearly great enough to insure efficient hydrogenation or even to enable the process to operate at all.

The following hydrogenations are illustrative of the invention, but it is not to be taken as limited to the specific conditions recited.

EXAMPLE I

*Production of sorbitol from glucose*

A 50% solution of glucose in water was made into a slurry with a conventional diatomaceous earth supported reduced nickel catalyst in proportions to give 2.0% nickel based on the glucose. This slurry was continuously fed into the bottom of a cylindrical reactor 3 inches in diameter by 6 feet high, at the rate of 3.8 liters per hour. The reactor was held at 161° C. and hydrogen pressure was maintained at 1000 pounds per square inch gauge. Hydrogen was continuously fed into the reactor through a perforated distributing nozzle at rates of 268, 233, and 206 cubic feet per hour (expressed at 0° C. and 1 atmosphere pressure) and the extent of reduction to sorbitol measured at the three different rates. The results were as follows:

| Hydrogen Rate | Extent of Reduction, Percent |
| --- | --- |
| 268 | 99.17 |
| 233 | 99.11 |
| 206 | 98.6 |

The critical hydrogen rate (CHR) for this reduction is 221 cubic feet per hour (expressed at 0° C. and 1 atmosphere pressure). The CHR is calculated as follows: The rate of hydrogen usage in the hydrogenation of glucose to sorbitol is given by the equation $$H = R \times C \times \frac{E}{100} \times \frac{1}{180} \times 359$$

wherein,
$R$=rate of sugar solution feed, gallons per hour
$C$=concentration of sugar in solution, pounds per gallon
$E$=extent of reduction, percent
180=molecular weight of glucose
359=volume of one pound mol at 0° C. and 1 atmosphere pressure In this example, sugar flow was metered in liters per hour requiring the use of the conversion factor $$\frac{1}{3.785}$$

(gallon per liter). The value of C was 5.17 pounds of glucose per gallon of solution. The extent of reduction E was taken as 99.1%. Substituting these values, $$H = 3.8 \times \frac{5.17}{3.785} \times \frac{359}{180} \times 0.991 = 10.26$$

applying Equation I $$CHR = (3.76 + 0.130H) \times \frac{273}{434} \times \frac{1015}{14.7} = 221$$

(corrected to standard conditions)

This example illustrates that even a small decrease in hydrogen rate below the critical rate (CHR) produces a substantial lowering of the extent of reductions. The importance of the effect is more clearly illustrated by a comparison of the amount of unreduced sugar in the product, less than 0.9% in the runs above the CHR and 1.4% or 55% more in the run below the CHR.

EXAMPLE 2

*Production of sorbitol from glucose*

A 50% solution of glucose in water was made into a slurry with a conventional diatomaceous earth supported reduced nickel catalyst in proportions to give 1.7% nickel based on the glucose. This slurry was continuously fed into the reactor described in Example 1 at the rate of 9.4 liters per hour. The reactor was held at 160° C. and hydrogen pressure was maintained at 1000 pounds per square inch gauge. Hydrogen was continuously fed into the reactor with the slurry at rates of 365, 302, and 228 cubic feet per hour at standard conditions and the extent of reduction to sorbitol measured. The results were as follows:

| Hydrogen Rate | Extent of Reduction, Percent |
| --- | --- |
| 365 | 94.4 |
| 302 | 94.0 |
| 228 | 91.0 |

The critical hydrogen rate (CHR) for this reduction is 300 cubic feet per hour at standard conditions. This figure is calculated from the equations used in Example 1. The runs reported illustrate the rapid dropping off of the extent of reduction when the hydrogen rate drops below the CHR.

EXAMPLE 3

*Production of sorbitol and mannitol from inverted sucrose*

A 50% solution of inverted sucrose in water was made into a slurry with a supported reduced nickel catalyst in proportions to give 1.7% nickel based on sugar. This slurry was continuously fed into the reactor described in Example 1 at the rate of 3.85 liters per hour. The reactor was held at 166° C. and hydrogen pressure was maintained at 1000 pounds per square inch gauge. This system was known from previous results in batch operations to be capable of performing a reduction to the extent of about 99.3% and applying the equations used in Example 1 the CHR to obtain this maximum reduction was 221 cubic feet per hour at standard conditions. In the run of the example a hydrogen rate of 358 cubic feet per hour at standard conditions was employed and the observed extent of reduction was 99.3%. The product was a solution of sorbitol and mannitol in water.

EXAMPLE 4

*Production of lactositol from lactose*

A 50% solution of lactose in water was made into a slurry with a supported reduced nickel catalyst in proportions to give 1.8% nickel based on sugar. This slurry was continuously fed into the reactor described in Example 1 at the rate of 5.93 liters per hour. The reactor was held at 160° C. and hydrogen pressure was maintained at 2000 pounds per square inch gauge. This system was known from previous results in batch operations to be capable of performing a reduction to the extent of about 98.6% and applying the equations used in Example 1 (molecular weight of lactose=342) the CHR to obtain this maximum reduction was 419 cubic feet per hour at standard conditions. In the run of the example a hydrogen rate of 740 cubic feet per hour at standard conditions was employed and the observed extent of reduction was 98.6%. The product was a solution of lactositol in water.

The preferred embodiment of the invention resides in the hydrogenation of glucose to sorbitol of maximum purity. In this process it is of great importance to carry the reduction as far as possible so as to keep the amount of residual sugar to a minimum. The presence of glucose in the sorbitol product is undesirable for certain uses, particularly where thermal stability is needed, and the removal of glucose by chemical or fermentation treatments is difficult and expensive. By applying the critical hydrogen rate information in accordance with this invention in conjunction with the previously known controls of temperature, 150 to 165° C., a finely divided supported reduced nickel catalyst, and pressure of 1000 to 2000 pounds per square inch gauge, products of uniformly low glucose content can be made.

The invention is not to be taken as limited to the examples given, nor to the specific conditions of catalyst, pressure, temperature and the like set out above for the purpose of illustration, but

I claim:

1. The process for continuously hydrogenating a reducible sugar to polyhydric alcohol which comprises continuously feeding into the lower end of a vertical reactor a suspension of finely divided hydrogenation catalyst in a solution of the sugar, maintaining the reactor at hydrogenating temperature, continuously feeding hydrogen under pressure into the lower end of said reactor, maintaining a selected hydrogenating pressure in the reactor, the rate of hydrogen feed being at least equal to the critical hydrogen rate, expressed in terms of linear feet of hydrogen flow per hour in the reactor at reactor pressure and temperature, required by the equation $$\text{critical hydrogen rate} = 76.5 + 0.130H$$

where $H$ = the rate of hydrogen usage in cubic feet per hour per square foot of reactor cross sectional area, hydrogen volume being expressed in terms of one atmosphere pressure and 0° C., and continuously removing the reaction mixture from the upper end of said reactor.

2. The process defined in claim 1 wherein the said reducible sugar is glucose.

3. The process defined in claim 1 wherein the said reducible sugar is inverted sucrose.

4. The process defined in claim 1 wherein the said reducible sugar is lactose.

5. The process for continuously hydrogenating a reducible sugar to polyhydric alcohol which comprises continuously feeding into the lower end of a vertical reactor a suspension of finely divided hydrogenation catalyst in a solution of the sugar; maintaining the reactor at hydrogenating temperature; continuously removing the reaction mixture from the upper end of said reactor; maintaining a body of hydrogen at a selected hydrogenating pressure in said reactor; continuously circulating said body of hydrogen by feeding it into the lower end of said reactor, withdrawing the unreacted portion of said body of hydrogen with said reaction mixture from the upper end of said reactor, separating the said unreacted portion of hydrogen from the other components of the reaction mixture, adding make-up hydrogen to replace the hydrogen used in the reaction plus any process losses, and returning the said unreacted hydrogen plus the make-up hydrogen to the reactor hydrogen feed; and maintaining the rate of hydrogen circulation in the reactor at a value not less than the critical hydrogen rate, expressed in terms of linear feet of hydrogen flow per hour in the reactor at reactor pressure and temperature, required by the equation $$\text{critical hydrogen rate} = 76.5 + 0.130H$$

where $H$ = the rate of hydrogen usage in cubic feet per hour per square foot of reactor cross sectional area, hydrogen volume being expressed in terms of one atmosphere pressure and 0° C.

6. The process defined in claim 5 wherein the said reducible sugar is glucose.

7. The process defined in claim 5 wherein the said reducible sugar is inverted sucrose.

8. The process defined in claim 5 wherein the said reducible sugar is lactose.

9. The process for continuously hydrogenating glucose to sorbitol which comprises continuously feeding into the lower end of a vertical reactor a suspension of glucose dissolved in water and a finely divided supported reduced nickel catalyst, maintaining the reactor at a temperature in the range 150 to 165° C., continuously introducing hydrogen under pressure into the lower end of said reactor, maintaining an operating pressure in the reactor of from 1,000 to 2,000 pounds per square inch gauge, the rate of hydrogen feed being at least equal to the critical hydrogen rate, expressed in terms of linear feet of hydrogen flow per hour in the reactor at reactor pressure and temperature, required by the equation $$\text{critical hydrogen rate} = 76.5 + 0.130H$$

where $H$ = the rate of hydrogen usage in cubic feet per hour per square foot of reactor cross-sectional area, hydrogen volume being expressed in terms of one atmosphere pressure and 0° C., and continuously removing the reaction mixture from the upper end of said reactor.

LEO KASEHAGEN.

References Cited in the file of this patent

UNITED STATES PATENTS

| Number | Name | Date |
|---|---|---|
| 1,963,997 | Larchar | June 26, 1934 |
| 2,164,268 | Covert | June 27, 1939 |
| 2,280,975 | Power | Apr. 28, 1942 |

OTHER REFERENCES

Groggins, "Unit Processes in Organic Syntheses," Third Ed., pages 523, 538, 539, 540 and 562. Pub. by McGraw-Hill Book Company, New York, 1947.